United States Patent
Staddon

(10) Patent No.: US 9,276,923 B1
(45) Date of Patent: *Mar. 1, 2016

(54) GENERATING AUTHENTICATION CHALLENGES BASED ON PREFERENCES OF A USER'S CONTACTS

(71) Applicant: Google Inc., Mountain View, CA (US)

(72) Inventor: Jessica Staddon, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,108

(22) Filed: Jul. 14, 2014

Related U.S. Application Data

(63) Continuation of application No. 13/204,921, filed on Aug. 8, 2011, now Pat. No. 8,782,761.

(51) Int. Cl.
*H04L 29/06* (2006.01)

(52) U.S. Cl.
CPC .................................... *H04L 63/08* (2013.01)

(58) Field of Classification Search
CPC ....... G06F 21/31; G06F 21/55; G06F 21/606; H04L 63/08
USPC .................. 726/7, 10, 21; 705/319; 455/410; 713/183
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,188,253 B2 | 3/2007 | Halasz et al. | |
| 7,278,028 B1 | 10/2007 | Hingoranee | |
| 7,360,248 B1 | 4/2008 | Kanevsky et al. | |
| 7,366,990 B2 | 4/2008 | Pitroda | |
| 7,373,137 B2 | 5/2008 | Lauridsen et al. | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,802,290 B1 | 9/2010 | Bansal | |
| 7,945,950 B2 | 5/2011 | Nanda et al. | |
| 2002/0137490 A1 | 9/2002 | Gallant | |
| 2002/0143874 A1 | 10/2002 | Marquette et al. | |
| 2004/0215793 A1 | 10/2004 | Ryan et al. | |

(Continued)

FOREIGN PATENT DOCUMENTS

WO    WO02079984    10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Hadi Armouche
*Assistant Examiner* — Angela Holmes
(74) *Attorney, Agent, or Firm* — Patent Law Works LLP

(57) ABSTRACT

Generating user authentication challenges based in part on preferences of one or more contacts of a user includes receiving an authentication request from a user. One or more contacts of the user associated with the authentication request are determined. One or more preferences of the close contact or contacts are determined. An authentication challenge based on the one or more preferences of one or more of the user's contacts is generated. The authentication request is allowed or denied based on the completion on the authentication challenge.

20 Claims, 6 Drawing Sheets

(56) References Cited

U.S. PATENT DOCUMENTS

| | | |
|---|---|---|
| 2004/0258220 A1 | 12/2004 | Levine et al. |
| 2005/0152521 A1 | 7/2005 | Liljestrand |
| 2006/0005020 A1 | 1/2006 | Hardt et al. |
| 2006/0005263 A1 | 1/2006 | Hardt et al. |
| 2006/0021009 A1 | 1/2006 | Lunt |
| 2006/0026288 A1 | 2/2006 | Acharya et al. |
| 2006/0077957 A1 | 4/2006 | Reddy et al. |
| 2006/0156385 A1 | 7/2006 | Chiviendacz et al. |
| 2006/0206604 A1 | 9/2006 | O'Neil et al. |
| 2006/0286965 A1 | 12/2006 | Lauridsen et al. |
| 2007/0127631 A1 | 6/2007 | Difiglia |
| 2007/0171898 A1 | 7/2007 | Salva |
| 2007/0173236 A1 | 7/2007 | Vishwanathan et al. |
| 2007/0234408 A1 | 10/2007 | Burch et al. |
| 2007/0248077 A1 | 10/2007 | Mahle, Jr. et al. |
| 2007/0250920 A1 | 10/2007 | Lindsay |
| 2008/0056475 A1 | 3/2008 | Brannick et al. |
| 2008/0066165 A1 | 3/2008 | Rosenoer |
| 2008/0102791 A1 | 5/2008 | Lauridsen et al. |
| 2008/0103972 A1 | 5/2008 | Lanc |
| 2008/0148366 A1 | 6/2008 | Wahl |
| 2008/0192656 A1 | 8/2008 | Vagelos |
| 2009/0259588 A1 | 10/2009 | Lindsay |
| 2009/0320101 A1 | 12/2009 | Doyle, III et al. |
| 2010/0010826 A1 | 1/2010 | Rosenthal et al. |
| 2010/0107225 A1 | 4/2010 | Spencer et al. |
| 2010/0131409 A1 | 5/2010 | Lawyer et al. |
| 2010/0218111 A1 | 8/2010 | Mitchell et al. |
| 2010/0293601 A1 | 11/2010 | Schultz et al. |
| 2010/0293608 A1 | 11/2010 | Schechter et al. |
| 2011/0098156 A1 | 4/2011 | Ng et al. |
| 2013/0047149 A1 | 2/2013 | Xu et al. |

OTHER PUBLICATIONS

Agarwal et al., "Enabling Real-Time User Interests for Next Generation Activity-Oriented Social Networks," Thesis submitted to the Indian Institute of Technology Dehli, Deparment of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

"The Blue Moon Authentication System," Internet, retrieved at http://www.ravenwhite.com/iforgotmypassword.html, Mar. 27, 2012, 5 pgs.

Boyd, et al., "Social Network Sites: Definition, History, and Scholarship," Journal of Computer-Mediated Communication, International Communication Association, 2008, pp. 210-230.

Brainard et al., "Fourth-Factor Authentication: Somebody You Know," CCS '06, Oct. 30-Nov. 3, 2006, 11 pgs.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

"Gwap", Internet, retrieved at http://www.gwap.com/gwap, Mar. 27, 2012, 1 pg.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, Apr. 26, 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Ali Imam, Visualize you LinkedIn Network with InMaps (http://blog.linkedin.com/2011/01/24/1inedin-inmaps/), dated Jan. 24, 2011.

Mannan, Mahammad, et al.; "Localization of Credential Information to Address Increasingly Inevitable Data Breaches"; NSPW '08: Proceedings of the 2008 workshop on New security paradigms; Aug. 2009, pp. 13-21.

O'Gorman, L.; "Comparing Passwords, tokens, and biometrics for user authentication"; Preceedings of the IEEE; vol. 91, Issue: 12; Digital Object Identifier: 10.1109/JPROC.2003.819611: publication Year: 2003, pp. 2021-2040.

Yardi et al., "Photo-Based Authentication Using Social Networks", WOSN'08, Seattle, Washington, Aug. 2008, ACM 978-1-60558-182-8/08/08, pp. 55-59.

GENERATING AUTHENTICATION CHALLENGES BASED ON PREFERENCES OF A USER'S CONTACTS

CROSS REFERENCE TO RELATED APPLICATIONS

This application is a continuation of and claims priority to U.S. application Ser. No. 13/204,921, filed Aug. 8, 2011, titled "Generating Authentication Challenges Based on Preferences of a User's Contacts," which is incorporated by reference in its entirety.

The specification relates to online user authentication. In particular, the specification relates to generating user authentication challenges, specifically, generating a user authentication challenge based at least in part on one or more preferences of an account owner's contacts in response to detecting a potentially fraudulent authentication attempt.

BACKGROUND

Websites provide the capability for users to login to view their personal information, or other information that the user wants to keep private, or even access the functionality provided by the website. An added level of security is established by generating a challenge to the user attempting to login. Generally, the challenge is the generation of a secret question or the generation of a Completely Automated Public Turning test to tell Computer and Humans Apart (CAPTCHA) to guard against possible fraudulent login attempts, and login by bots and other automated devices; although, other methods exist. One other method utilizes the user's own preferences in an authentication challenge.

SUMMARY OF THE INVENTION

One aspect features a system and method for generating a user authentication challenge based at least in part on one or more preferences of an account owner's contacts in response to detecting a potentially fraudulent authentication attempt. A system for generating a user authentication challenge, the system comprising: an authentication receiver for receiving an authentication request, wherein the authentication request includes primary authentication information and secondary authentication information from the user; a fraudulent authentication detection engine for detecting a potentially fraudulent authentication based on the secondary authentication information from the user; a close contact identifier engine for identifying one or more of the account owner's contacts; a contact preference engine for determining one or more preferences of the account owner's close contact or contacts; and a challenge generation engine for generating an authentication challenge based at least in part on one or more preferences of the account owner's close contact or contacts and sending the authentication challenge for display to the user. In one embodiment, a challenge assessment engine is present for determining whether the user successfully completed the authentication challenge.

A method for generating a user authentication challenge based at least in part on one or more preferences of an account owner's close contact or contacts in response to detecting a potentially fraudulent authentication attempt is also provided. An authentication request including primary authentication information from the user and secondary authentication information is received from a user. The authentication request is identified as a potentially fraudulent authentication attempt based on the secondary authentication information from the user. One or more of the account owner's contacts are identified. One or more preferences of the identified contacts are determined. An authentication challenge based at least in part on one or more preferences of the account owner's contacts is generated and sent for display to the user. The authentication request is allowed or denied based on the completion of the authentication challenge.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
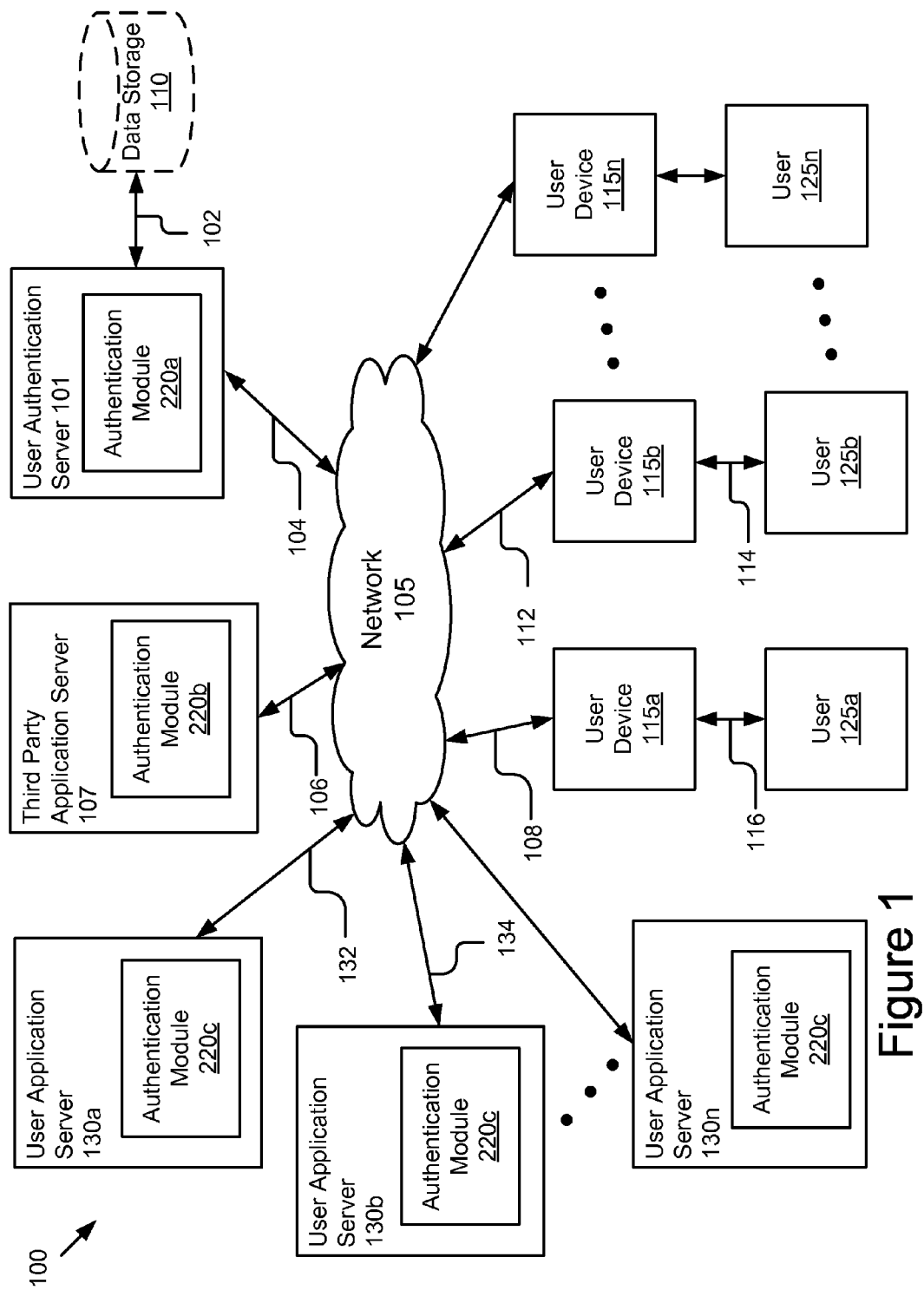
FIG. 1 illustrates a block diagram of a system for generating a user authentication challenge based at least in part on one or more preferences of an account owner's close contact or contacts in response to detecting a potentially fraudulent authentication attempt according to one embodiment.

A system and method for generating a user authentication challenge based at least in part on one or more preferences of an account owner's close contact or contacts in response to detecting a potentially fraudulent authentication attempt is described. In the following description, for purposes of explanation, numerous specific details are set forth in order to provide a thorough understanding. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, one embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the embodiments not described with reference to any particular programming language. It will be appreciated that a variety of programming languages may be used to implement the teachings as described herein.

System Overview

FIG. 1 illustrates a block diagram of a system 100 for generating a user authentication challenge based at least in part on one or more preferences of an account owner's close contact or contacts in response to detecting a potentially fraudulent authentication attempt according to one embodiment.

The illustrated embodiment of the system 100 for generating a user authentication challenge based at least in part on one or more preferences of an account owner's close contact or contacts includes user devices 115a, 115b and 115n that are accessed by users 125a, 125b and 125n, a user authentication server 101 and a third party server 107. The system 100 also includes user application servers 130a, 130b, and 130n. In the illustrated embodiment, these entities are communicatively coupled via a network 105. Although only three devices are illustrated, persons of ordinary skill in the art will recognize that any number of user devices 115n is available to any number of users 125n. Further, although only three user application servers 130a, 130b and 130n are illustrated, persons of ordinary skill in the art will recognize that any number of user application servers 130n.

The user devices 115a, 115b and 115n in FIG. 1 are used by way of example. While FIG. 1 illustrates three devices, the embodiment applies to any system architecture having one or more user devices and one or more user application servers. Furthermore, while only one network 105 is coupled to the user devices 115a, 115b, and 115n the user authentication server 101 and the third party server 107, in practice any number of networks 105 can be connected to the entities. Furthermore, while only one third party application server 107 is shown, the system 100 could include one or more third party application servers 107.

The network 105 enables communications between user devices 115a, 115b, 115n, the user authentication server 101, the third party application server 107 and user application servers 130a, 130b, 130n. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wire line or wireless (i.e., terrestrial—or satellite-based transceivers). In one embodiment, the network 105 is an IP-based wide or metropolitan area network.

In some embodiments, the network 105 helps to form a set of online relationships between users 125a, 125b, 125n, such as provided by one or more social networking systems. In one embodiment, system 100 is such a social networking system, including explicitly-defined relationships and relationships implied by social connections with other online users, where the relationships form a social graph. In some examples, the social graph can reflect a mapping of these users and how they are related.

In one embodiment, an authentication module 220a is included in the user authentication server 101 and is operable on the user authentication server 101. In another embodiment, the authentication module 220b is included in the third party application server 107 and is operable on a third party application server 107. In yet another embodiment, the authentication module 220c is included in the user application server 130a/130b/130n and is operable on the user application server 130a/130b/130c. Persons of ordinary skill in the art will recognize that the authentication module 220 can be included and is operable in any combination on the devices 115a, 115b, and 115n and servers 101, 107, 130a, 130b and 130a. In some embodiments the authentication module 220a/220b/220c includes multiple, distributed modules that cooperate with each other to perform the functions described below. Details describing the functionality and components of the authentication module 220a of the user authentication server 101 are explained in further detail below with regard to FIG. 3.

In the illustrated embodiment, the user devices 115a, 115b are coupled to the network 105 via signal lines 108 and 112, respectively. The user 125a is communicatively coupled to the user device 115a via signal line 116. Similarly, the user device 115b is coupled to the network via signal line 112. The user 125b is communicatively coupled to the user device 115b via signal line 114. The third party application 107 is communicatively coupled to the network 105 via signal line 106. The user authentication server 101 is communicatively coupled to the network 105 via signal line 104. In one embodiment, the user authentication server 101 is communicatively coupled to data storage 110 via signal line 102.

In one embodiment, data storage 110 stores data and information of users 125a/125b/125n of the system 100. Such stored information includes user profiles, user authentication information and other information identifying the users 125a/125b/125n of the system 100. Examples of information identifying users include, but are not limited to, the user's name, contact information, relationship status, likes, interests, links, education and employment, location, etc. In one embodiment, the information stored in data storage 110 also includes the user's list of current and past connections (including contacts) and the user's activities within the system 100, such as anything the user posts within the system 100 and any messages that the user sends to other users. In another embodiment, the data storage 110 stores the data and information associated with the activity of the user authentication server 101.

In one embodiment, which is discussed below, a storage device 214 (see FIG. 2) is included in the user authentication server 101 and storage 214 stores the data and information of users 125a/125b/125n of the system 100. In one embodiment, the storage device 214 stores the information discussed above in relation to the information stored in the data storage 110.

In one embodiment, the user device 115a/115b/115n is an electronic device having a web browser for interacting with the user authentication server 101 via the network 105 and is used by the user 125a/125b/125n to access information in the system 100. The user device 115a/115b/115n can be, for example, a laptop computer, a desktop computer, a tablet computer, a mobile telephone, a personal digital assistant (PDA), a mobile email device, a portable game player, a portable music player, a portable music player, or any other electronic device capable of accessing a network.

User Authentication Server 101

Figure 2:
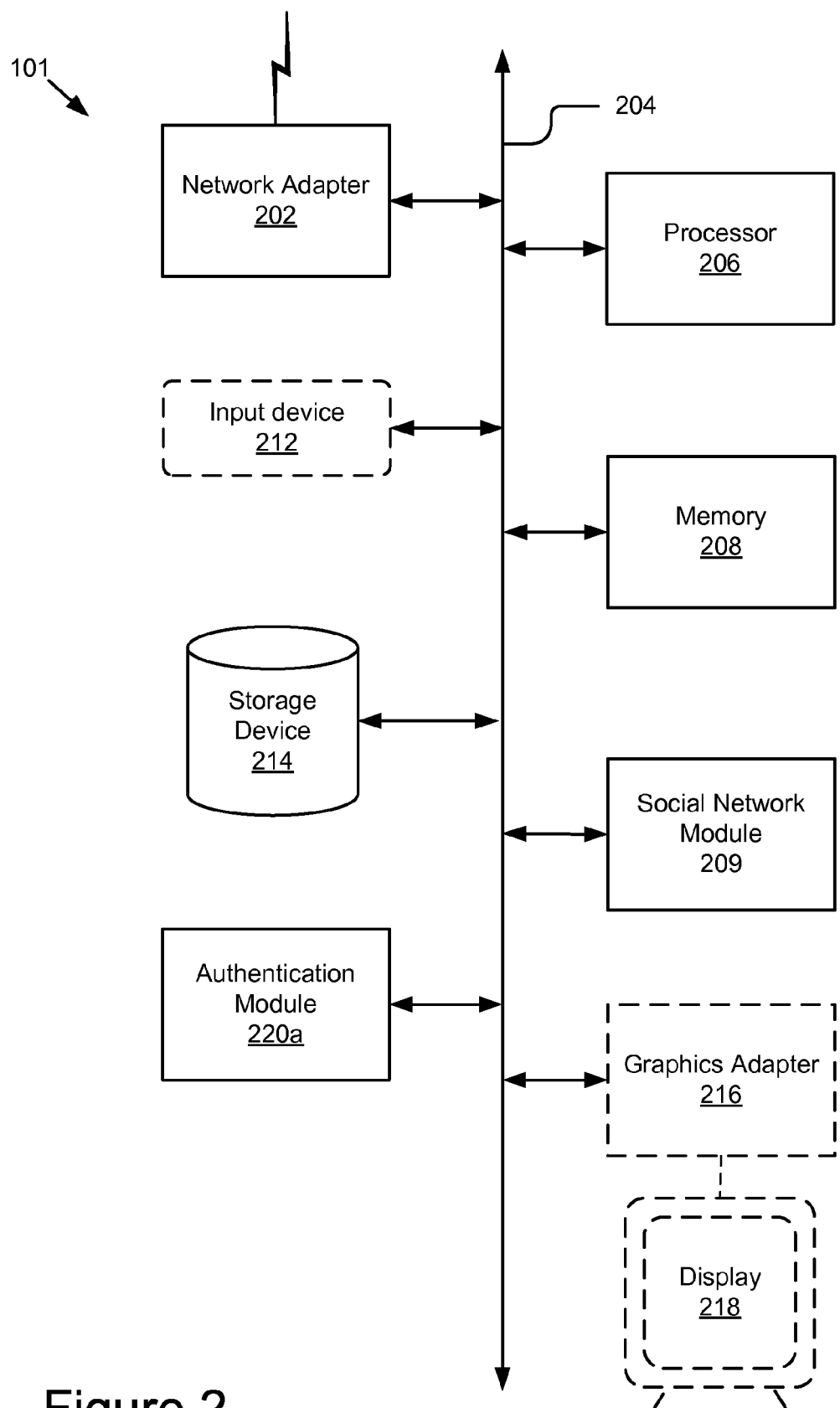
FIG. 2 is a block diagram of an embodiment of a user profile server.

FIG. 2 is a block diagram of an embodiment of the user authentication server 101. As illustrated in FIG. 2, the user authentication server 101 includes a network adapter 202 coupled to a bus 204. According to one embodiment, also coupled to the bus 204 are at least one processor 206, memory 208, a social network module 209, a graphics adapter 210, an input device 212, a storage device 214, and an authentication module 220a. In one embodiment, the functionality of the bus 204 is provided by an interconnecting chipset. The user authentication server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the user authentication server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The user authentication server 101 also includes an operating system executable by the processor such as but not limited to WINDOWS®, MacOS X, Android, or UNIX® based operating systems. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 208 stores instructions and/or data that may be executed by processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the user authentication server 101.

In one embodiment, the user authentication server 101 contains a social network module 209. Although only one user authentication server 101 is shown, persons of ordinary skill in the art will recognize that multiple servers may be present. A social network is any type of social structure where the users are connected by a common feature. Examples include, but are not limited to, Orkut, Buzz, blogs, microblogs, and Internet forums. The common feature can include, by way of example, friendship, family, a common interest, work, etc.

The social network module 209 is software and routines executable by the processor 206 to control the interaction between the user authentication server 101, storage device 214 and the user devices 115a, 115b, 115n. An embodiment of the social network module 209 allows users 125a, 125b, 125n of user devices 115a, 115b, 115n to perform social functions between other users 125a, 125b, 125n of user devices 115a, 115b, 115n within the system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125a, 125b, 125n of the system 100. In some embodiments, such user data is stored in storage device 214. In other embodiments, such user data is stored in data storage 110. In yet other embodiments, the user data is stored both is storage device 214 and data storage 110.

The input device 212 may include a mouse, track ball, or other type of pointing device to input data into the user authentication server 101. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 318 represents any device equipped to display electronic images and data as described herein. The network adapter 202 couples the user authentication server 101 to a local or wide area network.

The authentication module 220a is software and routines executable by the processor 206 to generate a user authentication challenge based at least in part on one or more preferences of an account owner's close contact or contacts in response to detecting a potentially fraudulent authentication attempt. Specifically, an embodiment of the authentication module 220a is software and routines executable by the processor 206 to receive an authentication request, including primary authentication information and secondary authentication information from the user; detect a potentially fraudulent authentication attempt based on the secondary authentication information from the user; identify one or more of the account owner's contacts; determine one or more preferences of one or more of the identified contacts; generate a user authentication challenge based at least in part on one or more preferences of the account owner's close contact or contacts; and send the authentication challenge for display to the user. In one embodiment, the authentication module 220a also determines whether a user successfully completes the authentication challenge based on a response received form the user. Details describing the functionality and components of the authentication module 220a are explained in further detail below with regard to FIG. 3.

As is known in the art, a user authentication server 101 can have different and/or other components than those shown in FIG. 2. In addition, the user authentication server 101 can lack certain illustrated components. In one embodiment, a user authentication server 101 lacks an input device 212, graphics adapter 210, and/or display 218. Moreover, the storage device 214 can be local and/or remote from the user authentication server 101 (such as embodied within a storage area network (SAN)).

As is known in the art, the user authentication server 101 is adapted to execute computer program modules for providing functionality described herein. As used herein, the term "module" refers to computer program logic utilized to provide the specified functionality. Thus, a module can be implemented in hardware, firmware, and/or software. In one embodiment, modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Authentication Module 220

Figure 3:
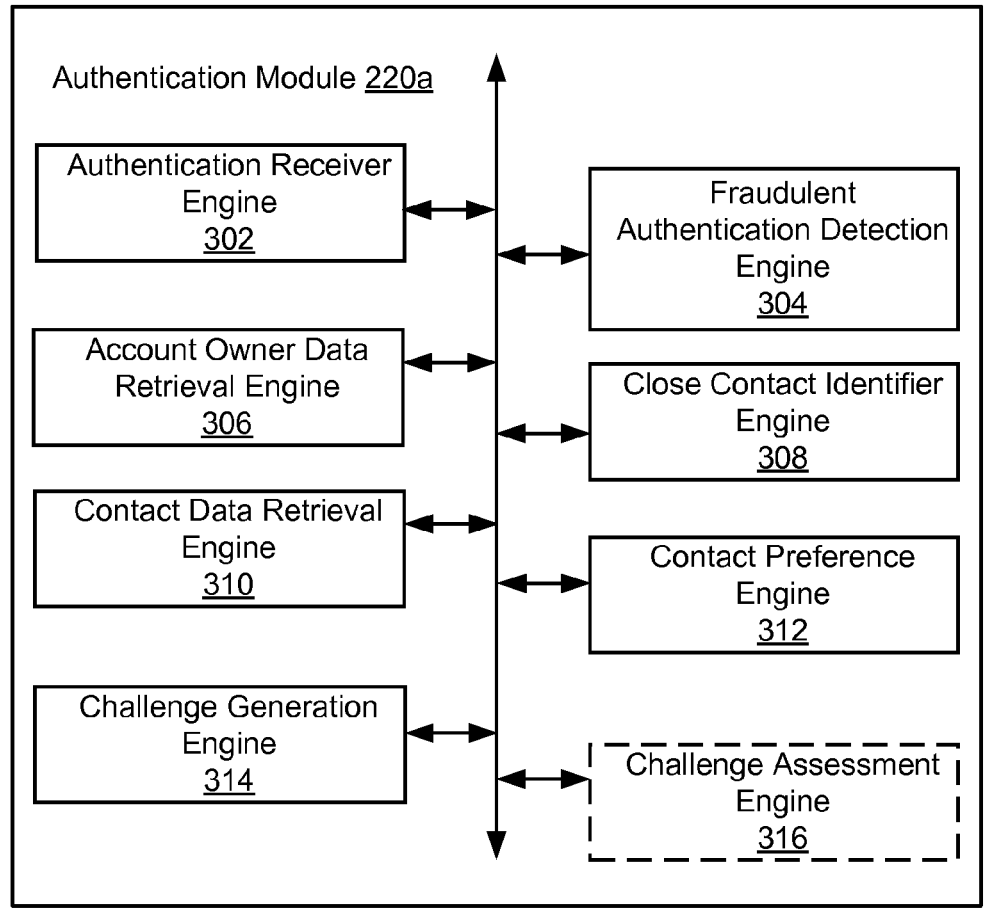
FIG. 3 is a block diagram illustrating an authentication module according to one embodiment.

Referring now to FIG. 3, the authentication module 220a is shown in more detail. In another embodiment, the third party application server 107 includes the authentication module 220b. In another embodiment, the authentication module 220a is software and routines executable by the processor 206 to generate a user authentication challenge based at least in part on one or more preferences of the account owner's close contact or contacts in response to detecting a potentially fraudulent authentication attempt. For the purposes of describing the components and functionality of the authentication module 220a/220b/220c, the below description describes the authentication module 220a. However, one of ordinary skill in the art will appreciate that the same description is also applicable to the functionality and components of authentication module 220b/220c.

In one embodiment, the authentication module 220a comprises an authentication receiver engine 302, a fraudulent authentication detection engine 304, an account owner data retrieval engine 306, a close contact identifier engine 308, a contact data retrieval engine 310, a contact preference engine 312, challenge generation engine 314, and an optional challenge assessment engine 316.

The authentication receiver engine 302 is software and routines executable by the processor 206 for receiving authentication requests from users 125a, 125b, 125n of user devices 115a, 115b, 115n. In one embodiment, the authentication receiver engine 302 is a set of instructions executable by a processor to provide the functionality described below for receiving authentication requests that include a username, password, and other authentication information from users 125a, 125b, 125n of user devices 115a, 115b, 115n. In another embodiment, the authentication receiver engine 302 is stored in memory of the user authentication server 101 and is accessible and executable by the processor. In either embodiment, the authentication receiver engine 302 is adapted for cooperation and communication with the processor and other components of the user authentication server 101 via a bus and network 105.

According to one embodiment, the authentication receiver engine 302 is communicatively coupled to the storage device 214 via bus 204. The authentication receiver engine 302 of the authentication module 220a is also communicatively coupled by the bus 204 and the network 105 to the user devices 115a, 115b, 115n in order to receive authentication requests from the devices 115a, 115b, 115n.

As an example, in one embodiment, if the authentication request does not include a correct user name and password, the authentication attempt is denied. In one embodiment, the authentication module 220a is used in account recovery for generating an authentication challenge based at least in part on a preference of an account owner's contact when the account owner has forgotten his, or her, username or password. In one embodiment, if the authentication request includes a correct username and password, the authentication request is sent to the fraudulent authentication detection engine 304. In another embodiment, if the authentication request includes primary authentication information and secondary authentication information, the authentication request is sent to the fraudulent authentication detection engine 304.

The fraudulent authentication detection engine 304 is software and routines executable by a processor for detecting a potentially fraudulent authentication attempt based on the secondary authentication information included in the authentication request. In one embodiment, the fraudulent authentication detection engine 304 is a set of instructions executable by the processor to detect a potentially fraudulent authentication attempt based on the secondary authentication information included in the authentication request. In another embodiment, the fraudulent authentication detection engine 304 is stored in memory of the user authentication server 101 and is accessible and executable by the processor. In either embodiment, the fraudulent authentication detection engine 304 is adapted for cooperation and communication with the processor and other components of the user authentication server 101 via a bus and network 105.

Examples of primary authentication information include, but are not limited to, a user name and/or password, a user alias, a retina scan of a user, a fingerprint swipe of a user, or an electronic identifier, such as an electronic of magnetic badge swipe, or other similar forms of user identifier information. Examples of secondary authentication information include, but are not limited to, the IP address of the computer from which the authentication request is coming, the device identification number of the device being used, and/or the location of the computer from which the authentication request is coming, including the state and/or country, and browser cookies. In one embodiment, the fraudulent authentication detection engine 304 detects a potentially fraudulent authentication by analyzing this secondary authentication information. For example, in one embodiment, if the IP address associated with the authentication request is an IP address of a "blacklisted" user, or a suspected bot, the fraudulent authentication detection engine 304 identifies the authentication as potentially fraudulent. In one embodiment, the fraudulent authentication detection engine 304 detects a potentially fraudulent authentication by comparing this secondary authentication information to historical authentication information of the account owner. For example, in one embodiment, if the authentication attempt originates from a country, or device, that the user has never attempted to authenticate from, the fraudulent authentication detection engine 304 identifies the authentication as potentially fraudulent. In one embodiment, the authentication is allowed if the authentication request is not identified as potentially fraudulent. In one embodiment, if the authentication attempt is identified as potentially fraudulent the account owner's one or more contacts are determined. In some embodiments, a potentially fraudulent authentication attempt includes a failed authentication attempt.

The account owner data retrieval engine 306 is software and routines executable by a processor for retrieving the account owner data used by the close contact identifier engine 308. In one embodiment, the account owner data retrieval engine 306 is a set of instructions executable by the processor to retrieve the account owner data used by the contact identifier engine 308. In another embodiment, the account owner data retrieval engine 306 is stored in memory of the user authentication server 101 and is accessible and executable by the processor. In either embodiment, the account owner data retrieval engine 306 is adapted for cooperation and communication with the processor and other components of the user authentication server 101 via a bus and network 105.

Figure 5:
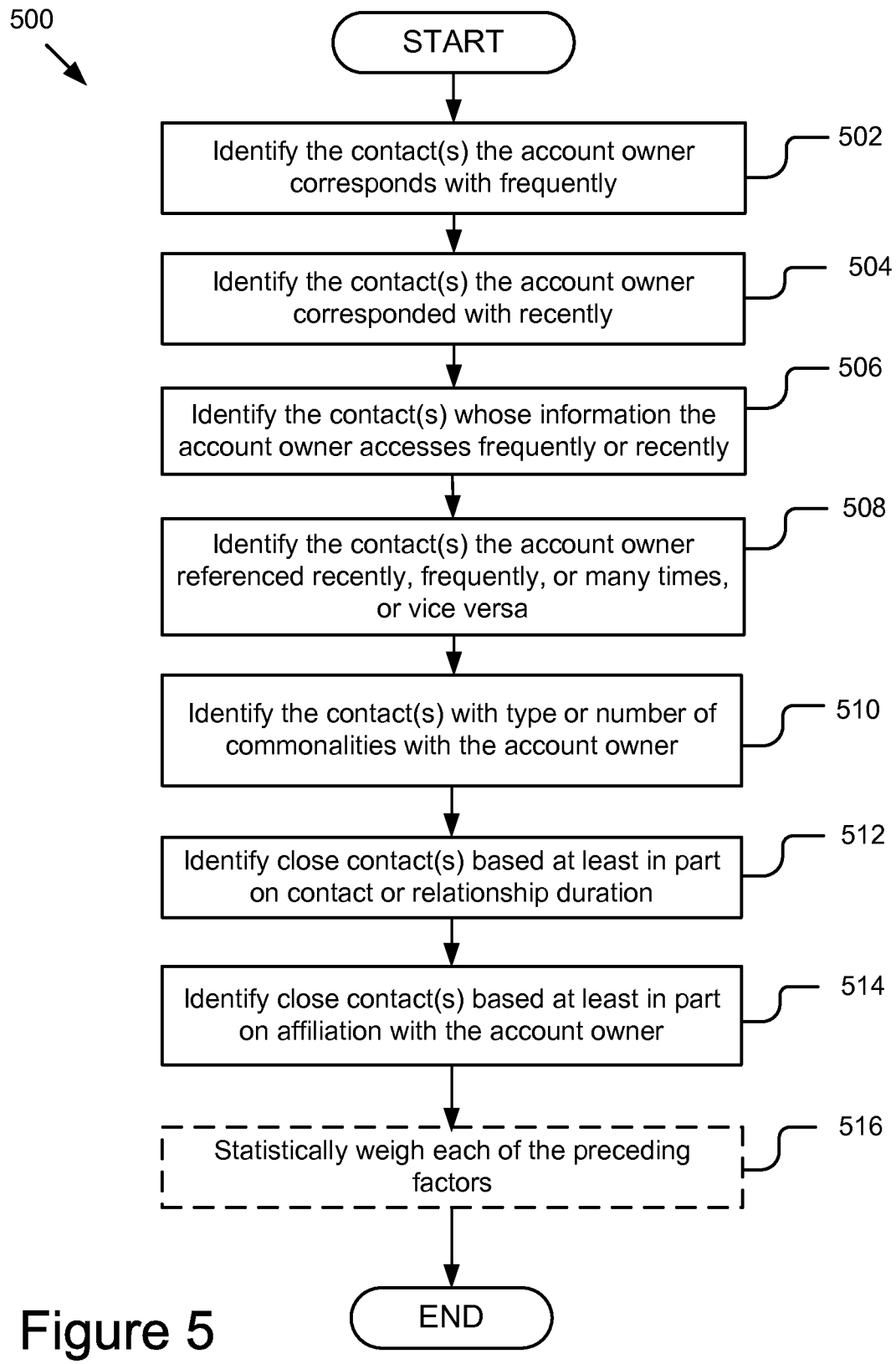
FIG. 5 is a flow chart illustrating part of a method for identifying one or more of an account owner's contacts according to one embodiment.

The close contact identifier engine 308 is software and routines executable by a processor for identifying one or more of the account owner's contacts, specifically, one or more contacts close enough to the account owner that the account owner can correctly answer questions concerning one or more preferences of the close contact or contacts. FIG. 5, which is described in more detail below, depicts a flow chart illustrating a method for identifying one or more of an account owner's contacts according to one embodiment. In one embodiment, the close contact identifier engine 308 is a set of instructions executable by the processor to provide the functionality described below for identifying one or more of an account owner's contacts. In another embodiment, the close contact identifier engine 308 is stored in the memory of the user authentication server 101 and is accessible and executable by the processor 206. In either embodiment, the close contact identifier engine 308 is adapted for cooperation and communication with the processor and other components of the user authentication server 101 via bus 204 and network 105.

The close contact identifier engine 308 may use any number of different factors in identifying the one or more close contacts that the account owner can correctly answer questions regarding one or more of the contact's or contacts' preferences. In one embodiment, the frequency of interaction between the account owner and a contact is a factor in identifying if the contact is a close contact. In one embodiment, the interaction is correspondence between the account owner and each contact, for example a post or message. In one embodiment, the interaction is the account owner accessing each contact's data, for example viewing photos or a profile page. In one embodiment, the interaction is the account owner or the contact referencing each other. For example, if the account owner is frequently mentioned by name in the contact's posts, or if the contact frequently appears in the account owner's photographs, it could indicate the account owner is close to that contact. In one embodiment, the frequency of interactions is analyzed over the entire duration of the account owner's account. In another embodiment, the frequency of interactions is analyzed over a shorter period, for example, the last thirty days. In one embodiment, how recently an interaction occurred is a factor in identifying whether an account owner's contact is a close contact, for example, in one embodiment, the most recent contact to tag a photo of the account owner is identified as a contact.

In one embodiment, the type and number of commonalities between the account owner and a contact is a factor in identifying whether an account owner's contact is a close contact. Commonalities are anything that the contact and account owner have in common, for example, the account owner and contact both work at the same place; they both graduated in the same year, from the same school, in the same major; they have a large number of contacts in common; or they both in belong to the same affinity groups. In one embodiment, the duration of the account owner's contact or relationship with a contact is a factor in identifying whether the contact is a close contact. In one embodiment, the account owner's affiliation with a contact is a factor in identifying whether a contact is a close contact. For example, if the account owner is dating or is closely related to the contact, in one embodiment, the contact is a close contact.

In one embodiment, a plurality of factors is utilized in order to identify one or more of the account owner's contacts. In one embodiment, the plurality of factors used to identify the account owner's close contact or contacts are statistically weighted. In one embodiment, where more than one factor is used, an additional factor is an "or" which expands the identified contacts. For example, contact A and B interact with the account owner frequently and contact B and C are related to the account owner. In one embodiment, contact A, B, and C is identified as contacts because A, B, and C are close based on association or interaction frequency factors. In one embodiment, where more than one factor is used, an additional factor is an "and" which narrows the identified contacts. Using the example of contact A, B, and C, in one embodiment, only B is identified as contact because only B is close based on association and interaction frequency factors. In one embodiment, a plurality of factors are used to identify the account owner's contacts, wherein the plurality of factors contains both "and" and "or" factors.

In one embodiment, the close contact identifier engine 308 only identifies one contact. In one such embodiment, the close contact identifier engine 308 only identifies the contact determined to be the account owner's closest contact. In one embodiment, a plurality of contacts is identified. In one embodiment, all of the account owner's contacts are identified. In one embodiment, the account owner may explicitly select one or more contacts. In such an embodiment, the close contact identifier engine 308 determines the account owner's close contact or contacts to be the one or more contacts explicitly selected by the account owner.

The contact data retrieval engine 310 is software and routines executable by the processor 206 for retrieving data used by the contact preference engine 312 of one or more of the identified contacts. In one embodiment, the contact data retrieval engine 310 is a set of instructions executable by a processor to retrieve data used by the contact preference engine 312 of one or more of the identified contacts. In another embodiment, the contact data retrieval engine 310 is stored in memory of the user authentication server 101 and is accessible and executable by the processor. In either embodiment, the contact data retrieval engine 310 is adapted for cooperation and communication with the processor and other components of the user authentication server 101 via bus 204 and network 105.

Figure 6:
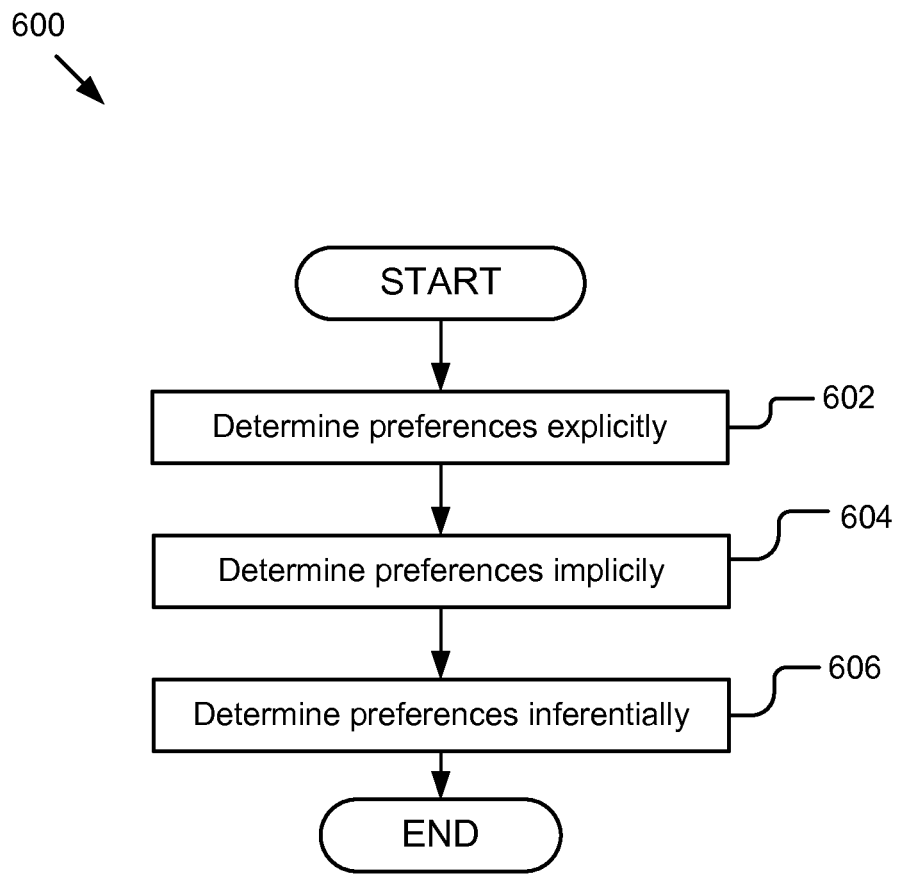
FIG. 6 is a flow chart illustrating a method for determining one or more preferences of an account owner's close contact or contacts according to one embodiment.

The contact preference engine 312 is software and routines executable by a processor for determining one or more preferences of one or more of the account owner's identified contacts. FIG. 6, which is described in more detail below, depicts a flow chart illustrating a method for determining one or more preferences of one or more of the account owner's contacts. In one embodiment, the contact preference engine 312 is a set of instructions executable by the processor to provide the functionality described below for determining one or more preferences of one or more of the account owner's identified contacts. In another embodiment, the contact preference engine 312 is stored in memory of the user authentication server 101 and is accessible and executable by the processor. In either embodiment, the contact preference engine 312 is adapted for cooperation and communication with the processor and other components of the user authentication server 101 via bus 204 and network 105.

In one embodiment, the contact preference engine 312 determines one or more preferences of one or more of the account owner's contacts explicitly. For example, a quiz or questionnaire regarding personal preferences, or membership in an affinity group like "The University of Miami Football Fan Club" can demonstrate one or more preferences explicitly.

In one embodiment, the contact preference engine 312 determines one or more preferences of one or more of the account owner's contacts implicitly. For example, in one embodiment, if the contact attends the University of Miami and has a photo album titled "College Football," or many posts referring to football and tailgating, it is implicit that the contact has a preference for the University of Miami football team and the contact preference engine 312 associates the preference for University of Miami football with that contact.

In one embodiment, the contact preference engine 312 determines one or more preferences of one or more of the user's contacts through inference. For example, if the contact has an art degree, the contact preference engine 312 may determine through inference that the contact has a preference for form over function to the contact. For another example, if the contact graduated from Harvard, the contact preference engine 312 may determine through inference that the contact prefers that Yale's teams do poorly because of the rivalry between the schools. In another embodiment, the contact preference engine 308 uses a combination of explicitly, implicitly, and inferentially determining one or more preferences of one or more of the user's contacts. In one embodiment, inferential determination includes determining preferences based on data collected from contacts playing an online game.

The challenge generation engine 314 is software and routines executable by a processor for generating authentication challenges based at least in part on one or more preferences of one or more of the an account owner's contacts and sending the authentication challenge for display to the user. In one embodiment, the challenge generation engine 314 is a set of instructions executable by the processor to provide the functionality described below for generating authentication challenges based at least in part on one or more preferences of one or more of the account owner's contacts and sending the authentication challenge for display to the user. In another embodiment, the challenge generation engine 314 is stored in memory of the user authentication server 101 and is accessible and executable by the processor. In either embodiment, the challenge generation engine 314 is adapted for cooperation and communication with the processor and other components of the user authentication server 101 via bus 204 and network 105.

According to one embodiment, the challenge generation engine 314 generates a direct challenge based at least in part on one or more preferences of one or more of the account owner's contacts. For example, "What is Paul's favorite college football team?" directly challenges the user's knowledge of the account owner's contact Paul's football team preference. According to another embodiment, the challenge generation engine 314 generates an indirect challenge based at least in part on one or more preferences of one or more of the account owner's contacts. For example, "Which football match-up is Paul most likely to watch?" challenges the user's knowledge of the account owner's contact Paul's preferred team or teams indirectly. In one embodiment, the challenge generation engine 314 generates a challenge that is close-ended or with a finite number of fixed choices, for example, multiple-choice or matching. In another embodiment, the challenge generation engine 314 generates a challenge that is open ended or has almost limitless choices, for example, fill-in-the-blank.

In one embodiment, the challenge generation engine 314 generates a single challenge. In another embodiment, the challenge generation engine 314 generates multiple challenges. In one embodiment, the challenge generation engine 314 generates a challenge based at least in part on one preference of one contact. In another embodiment, the challenge generation engine 314 generates a challenges based at least in part on a plurality of preferences of one contact. In yet another embodiment, the challenge generation engine 314 generates a challenge based at least in part on one preference from each of a plurality of contacts. In still another embodiment, the challenge generation engine 314 generates a challenge based at least in part on a plurality of preferences from a plurality of contacts.

In one embodiment, the challenge generation engine 314 generates a challenge based at least in part on one or more preferences of the contact identified as the account owner's closest contact. In another embodiment, the challenge generation engine 314 generates a challenge based at least in part on one or more preferences of one or more contacts randomly selected from the account owner's identified contacts.

The challenge assessment engine 316 is software and routines executable by a processor for determining whether a generated authentication challenge has been successfully completed. In one embodiment, the challenge assessment engine 316 is a set of instructions executable by the processor to provide the functionality described below for determining whether a generated authentication challenge has been successfully completed. In another embodiment, the challenge assessment engine 316 is stored in memory of the user authentication server 101 and is accessible and executable by the processor. In either embodiment, the challenge assessment engine 316 is adapted for cooperation and communication with the processor and other components of the user authentication server 101.

According to some embodiments, the challenge assessment engine 316 receives a response from the user after the challenge generation engine 314 generates, sends and presents an authentication challenge to the user 125a/125b/125n via the user device 115a/115b/115n. The challenge assessment engine 316 compares a received response with information associated with the account owner's close contact or contacts and determines the success or failure based on the comparison.

Method

Figure 4:
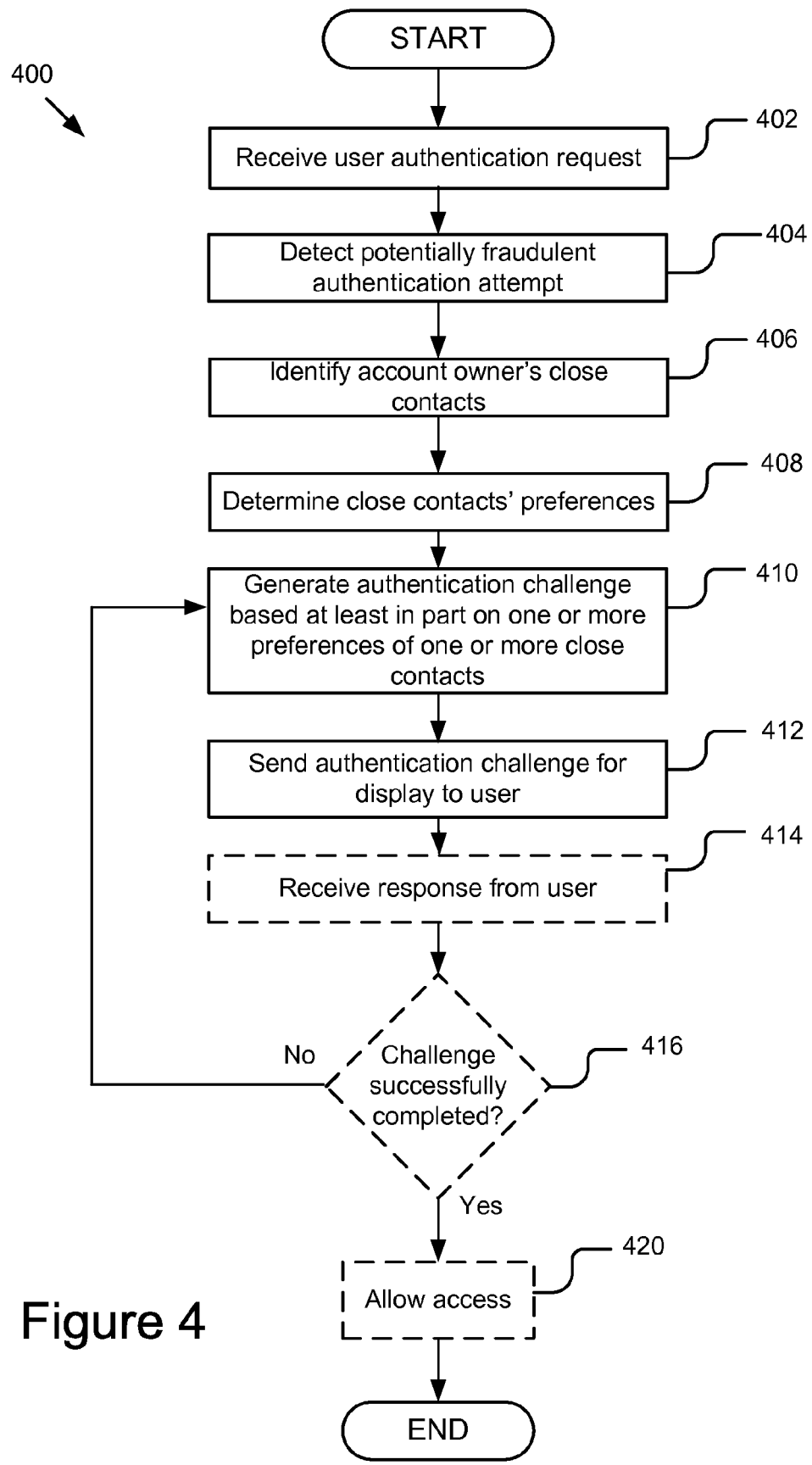
FIG. 4 is a flow chart illustrating a method for generating a user authentication challenge based at least in part on one or more preferences of an account owner's close contact or contacts in response to detecting a potentially fraudulent authentication attempt according to one embodiment.

Referring now to FIG. 4, a flow chart illustrating an embodiment of a method 400 for generating a user authentication challenge based at least in part on one or more preferences of one or more of an account owner's contacts is shown. The method 400 begins when the authentication receiver engine 302 of the authentication module 220a receives 402 an authentication request from a user 125a/125b/125n of a user device 115a/115b/115n. As mentioned above, in one embodiment, the authentication request includes primary authentication information as well as secondary authentication information from the user. The fraudulent authentication detection engine 304 of the authentication module 220a detects 404 a potentially fraudulent authentication attempt based on the secondary authentication information from the user. In some embodiments, a potentially fraudulent authentication attempt includes a failed authentication attempt. For example, a failed authentication attempt, may be a user providing an incorrect password. As mentioned above, examples of secondary authentication information include, but are not limited to, the IP address of the computer from which the authentication request is coming, the device identification number of the device being used, and/or the location of the device from which the authentication request is coming, including the state and/or country, and browser cookies.

The account owner data retrieval engine 306 retrieves (not shown) the account owner's data. The close contact identifier engine 308 of the authentication module 220a identifies 406 which close contact or contacts are the account owner's contacts.

Turning to FIG. 5, a flow chart illustrating a method 500 for identifying one or more of the account owner's contacts as performed by the close contact identifier engine 308 of the authentication module 220a is shown according to one embodiment. As will be apparent to one of ordinary skill in the relevant art, the illustrated embodiment is just one example. Many other embodiments exist, which may omit factors and/or include additional or other factors. In one embodiment, the close contact identifier engine 308 identifies 502 a close contact or contacts based at least in part on correspondence frequency as a factor. In one embodiment, the close contact identifier engine 308 identifies 504 a close contact or contacts based at least in part on recentness of correspondence as a factor. In one embodiment, the close contact identifier engine 308 identifies 506 a close contact or contacts based at least in part on whose information the account owner accesses the frequently or recently as a factor. In one embodiment, the close contact identifier engine 308 identifies 508 a close contact or contacts based at least in part on the how recent or frequently the account owner referenced the contact, or contacts, or vice versa as a factor. In one embodiment, the close contact identifier engine 308 identifies 510 a close contact or contacts based at least in part on the type or number of commonalities with the account owner as a factor. In one embodiment, the close contact identifier engine 308 identifies 512 the close contact or contacts based at least in part on the duration of contact or relationship with the account owner as a factor. In one embodiment, the close contact identifier engine 308 identifies 514 a close contact or contacts based at least in part on affiliation with the account owner as a factor. As discussed above, in some embodiments, more than one factor 504-514 are used to identify an account owner's close contact or contacts. In one such embodiment, each factor is statistically weighted 516, perhaps to determine the account owner's contact. Also as discussed above, in one embodiment, when more than one factor is used to identify a close contact or contacts, each factors can be an "and" factor or an "or" factor in order to narrow or expand the number of contacts identified, respectively.

Referring again to FIG. 4, the data retrieval engine 310 then retrieves (not shown) the data of one or more of the account owner's contacts identified 404 by the contact identifier 308. The contact preference engine 312 then determines 408 one or more preferences of one or more of the account owner's contacts.

Turning to FIG. 6, a flow chart illustrating a method 600 for analyzing and determining a one or more preferences as performed by the contact preference engine 312 of the authentication module 220a is shown according to one embodiment. In one embodiment, the contact preference engine 312 determines 602 a contact's preference explicitly. In one embodiment, the contact preference engine 312 determines 604 a contact's preference implicitly. In one embodiment, the contact preference engine 312 determines 606 a contact's preference inferentially. As an example, in one embodiment, inferential determination includes determining preferences based on data collected from contacts playing an online game. A person having ordinary skill in the art will realize that this is just one embodiment and each step 602-606 can be performed alone or in combination to determine one or more preferences of an identified contact. In one embodiment, where a plurality of contacts is identified the contact preference engine 312 determines one or more preferences for each contact.

Turning back to FIG. 4, the challenge generation engine 314 of the authentication module 220a generates 410 at least one authentication challenge based at least in part on one or more preferences of one or more of the account owner's contacts. In one embodiment, the challenge generation engine 314 generates a direct authentication challenge based on one or more preferences of one or more of the account owner's contacts (not shown). In another embodiment, the challenge generation engine 314 generates an indirect authentication challenge based on one or more preferences of one or more of the account owner's contacts (not shown). In one embodiment, the challenge generation engine 314 generates an open-ended challenge, for example fill-in-the-blank (not shown). In another embodiment, the challenge generation engine 314 generates a close-ended challenge, for example multiple-choice or matching (not shown). In one embodiment, the challenge generation engine 314 creates a challenge based at least in part on one or more preferences of the contact determined by the close contact identifier engine 308 to be the account owner's closest contact (not shown). In one embodiment, the challenge generation engine 310 generates an authentication challenge based at least in part on one or more preferences of a contact randomly selected from a plurality of identified contacts (not shown). In one embodiment, the challenge generation engine 314 generates an authentication challenge based at least in part on one or more preferences from a plurality of contacts (not shown). In one embodiment, the challenge generation engine 314 generates a plurality of authentication challenges based at least in part on one or more preferences of one or more of the account owner's contacts (not shown).

The challenge generation engine 314 sends 412 the authentication challenge for display to the user attempting to be authenticated. The challenge assessment engine 316 of the authentication module 220a receives a response from the user 414 and determines 416 whether the generated challenge was completed successfully. If the challenge was completed successfully (416—Yes), the access is allowed 420. In some embodiments, if the generated challenge was not completed successfully (416—No), another authentication challenge is generated 410. In some embodiments, this cycle of generating 410 and determination 416 of successful completion is repeated until the challenge is successfully completed. In other embodiments, this cycle of generating 410 and determination 416 of successful completion is repeated for a limited number of times and after the limit is reached, a warning is sent for display (not shown). In some embodiments, this cycle of generating 410 and determination 416 of successful completion is repeated three times, then after the fourth unsuccessful attempt, a warning is sent for display (not shown).

The foregoing description of the embodiments has been presented for the purposes of illustration and description. It is not intended to be exhaustive or to limit the embodiments to the precise form disclosed. Many modifications and variations are possible in light of the above teaching. It is intended that the scope be limited not by this detailed description, but rather by the claims of this application. As will be understood by those familiar with the art, the embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure of the embodiments is intended to be illustrative, but not limiting, of the scope, which is set forth in the following claims.

What is claimed is:

1. A computer-implemented method comprising:
    receiving, with one or more processors, a user authentication request from a user device of a user, the user authentication request includes primary authentication information associated with the user and secondary authentication information associated with the user device of the user;
    detecting, with the one or more processors, a potentially fraudulent authentication attempt based on the primary authentication information and the secondary authentication information associated with the user device of the user;
    in response to detecting the potentially fraudulent authentication attempt, identifying, with the one or more processors, a contact of the user based on statistically weighted factors associated with the contact, the statistically weighted factors reflecting recent interaction between the contact and the user;
    determining, with the one or more processors, a preference of the contact of the user, the preference includes information associated with the contact and is determined from data associated with the contact and identifiable by the user;
    generating, with the one or more processors, an authentication challenge based on the preference of the contact of the user; and sending, with the one or more processors, the authentication challenge for display to the user on the user device.

2. The computer-implemented method of claim 1, further comprising:

receiving a response from the user and assessing completion of the authentication challenge based on the response from the user.

3. The computer-implemented method of claim 1, wherein the contact of the user is identified at least in part by the frequency of interaction between the user and the contact.

4. The computer-implemented method of claim 1, wherein the contact of the user is identified at least in part by how recently the contact and the account owner interacted.

5. The computer-implemented method of claim 1, wherein the contact of the user is identified at least in part by the type or number of commonalties between the account owner and the contact alone or in combination.

6. The computer-implemented method of claim 1, wherein the contact of the user is identified at least in part by the duration of the contact or relationship between the account owner and the contact.

7. The computer-implemented method of claim 1, wherein the contact of the user is identified at least in part by the contact's affiliation with the account owner.

8. The computer-implemented method of claim 1, wherein the contact of the user is identified by statistically weighing a plurality of factors.

9. The computer-implemented method of claim 1, wherein the preference of the contact of the user is determined explicitly from the data of the one or more contacts.

10. The computer-implemented method of claim 1, wherein the preference of the contact of the user is determined implicitly from the data of the one or more contacts.

11. The computer-implemented method of claim 1, wherein the preference of the contact of the user is determined inferentially from the data of the one or more contacts.

12. The computer-implemented method of claim 1, wherein inferential determination includes determining preferences based on data collected from contacts playing an online game.

13. The computer-implemented method of claim 1, wherein the potentially fraudulent authentication attempt includes a failed authentication attempt.

14. A system for generating user authentication challenges, the system comprising:

one or more processors;

one or more memories storing instructions that, when executed by the one or more processors, cause the system to:

an authentication receiver for receiving a user authentication request from a user device of a user, the user authentication request includes primary authentication information associated with the user and secondary authentication information associated with the user device of the user;

a fraudulent authentication detection engine for detecting a potentially fraudulent authentication attempt based on the primary authentication information and the secondary authentication information associated with the user device of the user;

a close contact identifier engine for identifying with the one or more processors, a contact of the user based on statistically weighted factors associated with the contact, the statistically weighted factors reflecting recent interaction between the contact and the user;

a contact preference engine for determining a preference of the contact of the user, the preference includes information associated with the contact and is determined from data associated with the contact and identifiable by the user; and a challenge generation engine for generating an authentication challenge based on the preference of the contact of the user and for sending the authentication challenge for display to the user on the user device.

15. The system of claim 14, further comprising:

a challenge assessment engine for receiving a response from the user and assessing completion of the authentication challenge based on the response from the user.

16. The system of claim 14, wherein the contact of the user is identified at least in part by the frequency of interaction between the user and the contact.

17. The system of claim 14, wherein the contact of the user is identified at least in part by how recently the contact and the account owner interacted.

18. The system of claim 14, wherein the contact of the user is identified at least in part by the type or number of commonalties between the account owner and the contact alone or in combination.

19. The system of claim 14, wherein the contact of the user is identified at least in part by the duration of the contact or relationship between the account owner and the contact.

20. A computer program product comprising a non-transitory computer usable storage medium including a computer readable program, the computer readable program when executed by a processor causes the processor to:

receive a user authentication request from a user device of a user, the user authentication request includes primary authentication information associated with the user and secondary authentication information associated with the user device of the user;

detect a potentially fraudulent authentication attempt based on the primary authentication information and the secondary authentication information associated with the user device of the user;

in response to detecting the potentially fraudulent authentication attempt, identify a contact of the user based on statistically weighted factors associated with the contact, the statistically weighted factors reflecting recent interaction between the contact and the user;

determine a preference of the contact of the user, the preference includes information associated with the contact and is determined from data associated with the contact and identifiable by the user;

generate an authentication challenge based on the preference of the contact of the user; and send the authentication challenge for display to the user on the user device.

* * * * *